US009654780B2

(12) United States Patent
Jeong et al.

(10) Patent No.: US 9,654,780 B2
(45) Date of Patent: *May 16, 2017

(54) APPARATUS AND METHOD FOR ENCODING IMAGE DATA

(71) Applicant: SAMSUNG DISPLAY CO., LTD., Yongin, Gyeonggi-Do (KR)

(72) Inventors: Geun-Young Jeong, Yongin (KR); Byung-Hyun Kim, Yongin (KR); Ji-Yeon Yang, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,164

(22) Filed: Oct. 30, 2014

(65) Prior Publication Data

US 2015/0125086 A1   May 7, 2015

(30) Foreign Application Priority Data

Nov. 4, 2013   (KR) .......................... 10-2013-0132748

(51) Int. Cl.
| | |
|---|---|
| *H04N 19/136* | (2014.01) |
| *H04N 1/60* | (2006.01) |
| *H04N 11/04* | (2006.01) |
| *H04N 19/186* | (2014.01) |
| *G09G 3/20* | (2006.01) |

(Continued)

(52) U.S. Cl.
CPC ......... *H04N 19/136* (2014.11); *G09G 3/2003* (2013.01); *H04N 1/6005* (2013.01); *H04N 11/046* (2013.01); *H04N 19/105* (2014.11); *H04N 19/186* (2014.11); *H04N 19/50* (2014.11); *G09G 5/005* (2013.01); *G09G 5/02* (2013.01); *G09G 2300/0452* (2013.01);

(Continued)

(58) Field of Classification Search
CPC .. H04N 19/136; H04N 11/046; H04N 19/186; H04N 1/6005; G06T 11/001; G06T 2210/32; G06T 9/00
See application file for complete search history.

(56) References Cited

U.S. PATENT DOCUMENTS

| | | | | |
|---|---|---|---|---|
| 4,698,672 A | * | 10/1987 | Chen ....................... | H03M 7/42 358/1.9 |
| 5,973,740 A | * | 10/1999 | Hrusecky ............. | H04N 5/4401 348/E11.021 |

(Continued)

FOREIGN PATENT DOCUMENTS

| | | |
|---|---|---|
| JP | 10-108202 | 4/1998 |
| KR | 10-2011-0123531 | 11/2011 |

(Continued)

*Primary Examiner* — Jingge Wu
(74) *Attorney, Agent, or Firm* — Lee & Morse, P.C.

(57) ABSTRACT

An apparatus for encoding an image data includes a sub-pixel rendering unit and a first differential pulse code modulation (DPCM) processing unit. The sub-pixel rendering unit converts first image data of an RGB type to second image data of an RG-BG type. The DPCM processing unit generates first differential data including primary differential values corresponding to respective sub-pixels. To perform this operation, the DPCM processing unit calculates a gray value difference from a neighboring sub-pixel for each of the sub-pixels based on the second image data.

12 Claims, 3 Drawing Sheets

(51) Int. Cl.
  *H04N 19/105* (2014.01)
  *H04N 19/50* (2014.01)
  *G09G 5/00* (2006.01)
  *G09G 5/02* (2006.01)

(52) U.S. Cl.
  CPC ............... *G09G 2340/0428* (2013.01); *G09G 2340/0457* (2013.01); *G09G 2360/18* (2013.01)

(56) References Cited

U.S. PATENT DOCUMENTS

| | | | |
|---|---|---|---|
| 2002/0015046 A1* | 2/2002 | Okada | G09G 5/24 345/613 |
| 2002/0167596 A1* | 11/2002 | Suzuki | H04N 9/735 348/223.1 |
| 2003/0146920 A1* | 8/2003 | Tezuka | G06T 15/503 345/629 |
| 2003/0222998 A1* | 12/2003 | Yamauchi | G06T 3/4015 348/262 |
| 2007/0025630 A1 | 2/2007 | Sung et al. | |
| 2008/0107349 A1 | 5/2008 | Sung et al. | |
| 2008/0285884 A1* | 11/2008 | Nishijima | H04N 1/6027 382/274 |
| 2009/0304070 A1* | 12/2009 | Lamy-Bergot | H04N 21/2383 375/240.02 |
| 2011/0058064 A1* | 3/2011 | Hatano | H04N 1/393 348/223.1 |
| 2011/0273494 A1 | 11/2011 | Jun | |
| 2012/0120043 A1* | 5/2012 | Cho | G09G 3/2092 345/211 |
| 2013/0057521 A1 | 3/2013 | Kim | |
| 2013/0251032 A1* | 9/2013 | Tanaka | H04N 19/44 375/240.03 |
| 2014/0111557 A1* | 4/2014 | Omata | G09G 3/3233 345/690 |
| 2015/0117774 A1* | 4/2015 | Yang | G06T 9/00 382/166 |
| 2015/0138218 A1* | 5/2015 | Jeong | G09G 5/02 345/555 |
| 2015/0146978 A1* | 5/2015 | Kato | G06T 9/00 382/166 |

FOREIGN PATENT DOCUMENTS

| | | |
|---|---|---|
| KR | 10-2012-0052739 | 5/2012 |
| KR | 10-2013-0026628 | 3/2013 |

* cited by examiner

US 9,654,780 B2

APPARATUS AND METHOD FOR ENCODING IMAGE DATA

CROSS-REFERENCE TO RELATED APPLICATION

Korean Patent Application No. 10-2013-0132748, filed on Nov. 4, 2013, is incorporated by reference herein in its entirety.

BACKGROUND

1. Field

One or more embodiments described herein relate to encoding data.

2. Description of the Related Art

A variety of flat panel displays have been developed. Examples include liquid crystal displays, field emission displays, plasma display panel, and organic light emitting displays. These displays operate more efficiently than displays that use cathode ray tubes.

SUMMARY

In accordance with one embodiments, an apparatus for encoding an image data includes a sub-pixel rendering unit configured to convert first image data of an RGB type to second image data of an RG-BG type; and a first differential pulse code modulation (DPCM) processing unit configured to generate first differential data including primary differential values corresponding to respective sub-pixels, the DPCM processing unit to calculate a gray value difference from a neighboring sub-pixel for each of the sub-pixels based on the second image data.

The neighboring sub-pixel may be adjacent to a left side of each of the sub-pixels. The primary differential value corresponding to a leftmost sub-pixel among the primary differential values may be based on a difference between a reference gray scale value and a gray scale value corresponding to the leftmost sub-pixel. The reference gray scale value may be a gray scale value corresponding to a rightmost sub-pixel of a previous column.

The apparatus may include a second DPCM processing unit configured to generate second differential data including secondary differential values corresponding respectively to green sub-pixels except a leftmost green sub-pixel, the second DPCM processing unit to calculate a primary differential value difference from the neighboring sub-pixel for each of the green sub-pixels except the leftmost green sub-pixel based on the first differential data.

The second differential data may include the primary differential values corresponding to leftmost green sub-pixels together with the secondary differential values corresponding to respective ones of the green sub-pixels except for the leftmost green sub-pixel.

The apparatus may include a differential data converting unit configured to convert the first differential data by discarding a lower bit of each of the primary differential values, corresponding to a predetermined bit depth according to the arrangement position of the sub-pixels.

The apparatus may include an image processing unit configured to perform image processing on the first image data based on an image processing control signal, and to output the image-processed first image data to the sub-pixel rendering unit.

In accordance with another embodiment, a method for encoding an image data includes converting first image data of an RGB type to second image data of an RG-BG type by performing sub-pixel rendering on the first image data; and generating first differential data including primary differential values corresponding to respective sub-pixels, the first differential data generated by calculating a gray value difference from a neighboring sub-pixel for each of the sub-pixels based on the second image data.

The neighboring sub-pixel may be adjacent to a left side of each of the sub-pixels. The primary differential value corresponding to a leftmost sub-pixel among the primary differential values may be based on a difference between a reference gray scale value and a gray scale value corresponding to the leftmost sub-pixel. The reference gray scale value may correspond to a rightmost sub-pixel of a previous column.

The method may include generating a second differential data including secondary differential values corresponding respectively to green sub-pixels except the leftmost green sub-pixel, the second differential data generated by calculating a primary differential value difference from the neighboring sub-pixel for each of the green sub-pixels except the leftmost green sub-pixel based on the first differential data.

The second differential data may include the primary differential values corresponding to respective leftmost sub-pixels together with the secondary differential values corresponding to respective other green sub-pixels other than the leftmost pixel.

The method may include converting the first differential data by discarding a lower bit of each of the primary differential values, corresponding to a predetermined bit depth according to the arrangement position of the sub-pixels. Converting the first image data may include image-processing the first image data based on an image processing control signal; and converting the image-processed first image data to the second image data by performing sub-pixel rendering on the first image data.

In accordance with another embodiment, an encoder includes first logic to convert first image data of a first type to second image data of a second type; and second logic to generate first differential data including primary differential values corresponding to respective sub-pixels, the second logic to calculate a gray value difference from a neighboring sub-pixel for each of the sub-pixels based on the second image data. The first type may be RGB, and the second type may be RG-BG. The second logic may perform differential pulse code modulation processing.

The encoder may include third logic to generate second differential data including secondary differential values corresponding respectively to green sub-pixels except a leftmost green sub-pixel, the third logic to calculate a primary differential value difference from the neighboring sub-pixel for each of the green sub-pixels except a leftmost green sub-pixel based on the first differential data.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
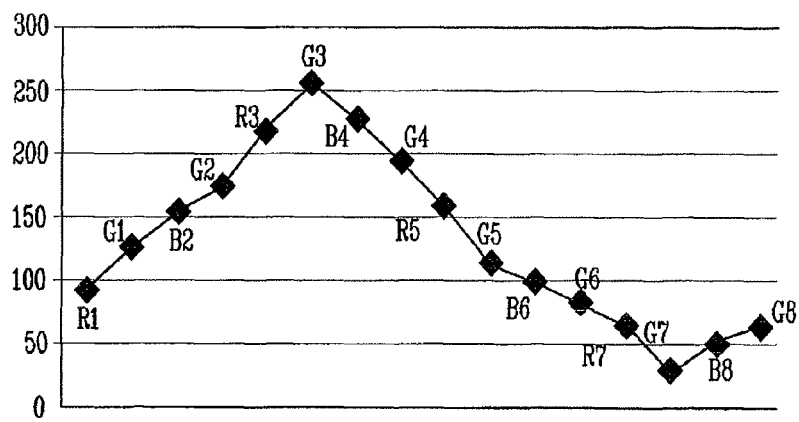
FIG. 1 illustrates an example of gray scale values produced when a gray-tone image is converted to an RG-BG type image.

FIG. 1 is a graph illustrating gray scale values produced when a gray-tone image is converted to an RG-BG type image. If the gray-tone image is converted to an RGB-type image, red, green and blue sub-pixels have gray scale values similar to one another. On the other hand, if the same gray-tone image is converted into an RG-BG type image, red, green and blue sub-pixels have gray scale values which are not similar to one another. This is because, in an RG-BG type image, the gray scale values of the sub-pixels are influenced by gray scale values of peripheral pixels due to sub-pixel rendering.

When a gray-tone image is converted into an RG-BG type image as shown in FIG. 1, a gray scale value R1, B2, R3, B4, etc., corresponding to a red or blue sub-pixel has a value between gray scale values G1, G2, G3, G4, etc., of adjacent green sub-pixels. For example, R3 has a value between G2 and G3, and B4 has a value between G3 and G4. Thus, in case of a gray-tone image, the range of a gray scale value corresponding to the red or blue sub-pixel may be limited between gray scales values G1, G2, G3, G4, etc., of adjacent green sub-pixels.

In one embodiment, a gray-tone image may include a black and white image as well as other types of images. For example, a gray-tone image includes not only a case where gray scale values corresponding to red, green and blue sub-pixels are equal to one another when the gray-tone image is converted to an RGB-type image, but also a case where the gray scale values corresponding to the red, green, and blue sub-pixels are or are not similar to one another. Thus, according to at least one embodiment, when a gray-tone image is converted to an RG-BG type image, the gray scale value corresponding to the red or blue sub-pixel may be between values between gray scale values of adjacent green sub-pixels.

Figure 2:
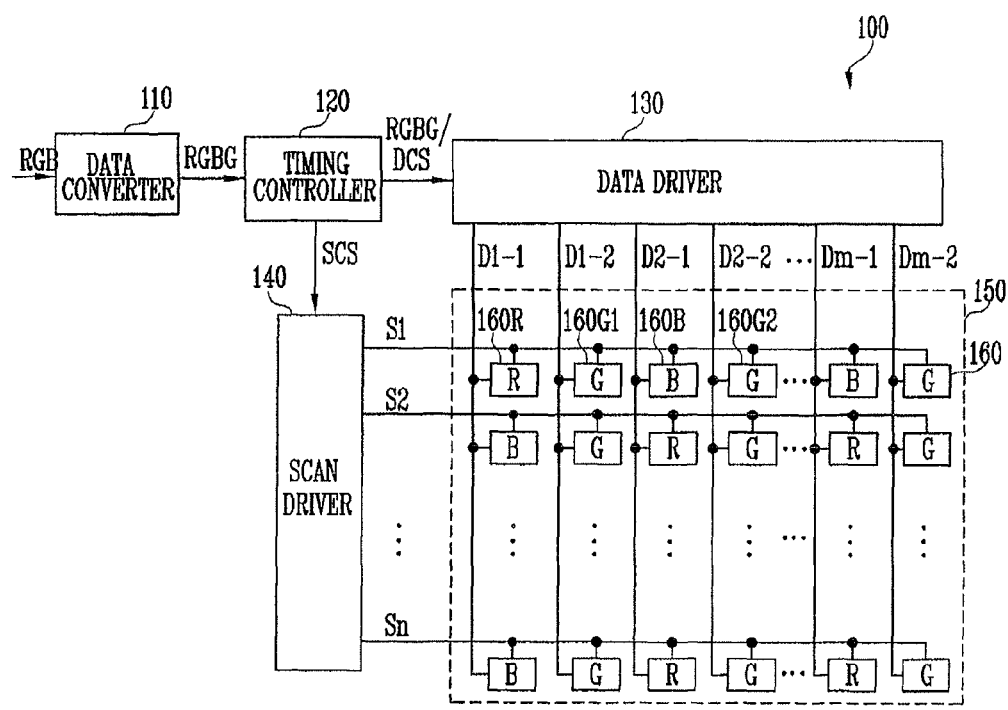
FIG. 2 illustrates an embodiment of a display device.

FIG. 2 illustrates an embodiment of a display device 100 which includes a data converter 110, a timing controller 120, data driver 130, scan driver 140, and display unit 150. The data converter 110 converts first image data RGB supplied from an external source (e.g., an application processor of a host) to second image data RGBG.

The first image data RGB is an RGB type image, and the second image data RGBG is an RG-BG type image. For example, the first image data RGB may be a data type image corresponding to a pixel configured with red, green, and blue sub-pixels. The second image data RGBG may be a data type image corresponding to a pixel configured with one of red or blue sub-pixels 160R and 160B and a green sub-pixel 160G1 or 160G2.

The data converter 110 converts the first image data RGB configured with three primary colors into second image data RGBG corresponding to the arrangement of sub-pixels in the display unit 150.

The timing controller 120 controls operations of the data driver 130 and the scan driver 140 based on a synchronization signal supplied from an external source. For example, the timing controller 120 generates a data driving control signal DCS and supplies the data driving control signal DCS to the data driver 130. The timing controller 120 generates a scan driving control signal SCS and supplies the scan driving control signal SCS to the scan driver 140.

The timing controller 120 supplies the second image data RGBG supplied from the data converter 110 to the data driver 130, in synchronization with the data driving control signal DCS and the scan driving control signal SCS.

The data driver 130 realigns the second image data RGBG supplied to the timing controller 120, in response to the data driving control signal DCS from the timing controller 120, and supplies the realigned second image data RGBG as data signals to the data lines D1-1 to Dm-1 and D1-2 to Dm-2.

For example, the data driver 130 supplies data signals corresponding to the red sub-pixel 160R or the blue sub-pixel 160B through the first data lines D1-1 to Dm-1. In addition, the data driver 130 supplies data signals corresponding to the green sub-pixels 160G1 and 160G2 through the second data lines D1-2 to Dm-2.

The scan driver 140 progressively supplies a scan signal to the scan lines S1 to Sn, in response to the scan driving control signal SCS from the timing controller 120.

The display unit 150 includes the sub-pixels 160R, 160G1, 160B, and 160G2 respectively disposed at intersection portions of the data lines D1-1 to Dm-1 and D1-2 to Dm-2 and the scan lines S1 to Sn. The data lines D1-1 to Dm-1 and D1-2 to Dm-2 are arranged in a vertical direction, and the scan lines S1 to Sn are arranged in a horizontal direction. Any one of the red and blue sub-pixels 160R and 160B and the green sub-pixel 160G1 or 160G2 constitute one pixel.

The sub-pixels 160R, 160G1, 160B, and 160G2 are coupled to a corresponding data line among the data lines D1-1 to Dm-1 and D1-2 to Dm-2 and a corresponding scan line among the scan lines S1 to Sn.

Each sub-pixel 160R, 160G1, 160b, or 160G2 emits light with luminance based on a data signal supplied through a corresponding one of the data lines D1-1 to Dm-1 and D1-2 to Dm-2. Although the data converter 110 and the timing controller 120 are illustrated as separate components, the data converter 110 and the timing controller 120 may be implemented in one integrated circuit.

Figure 3:
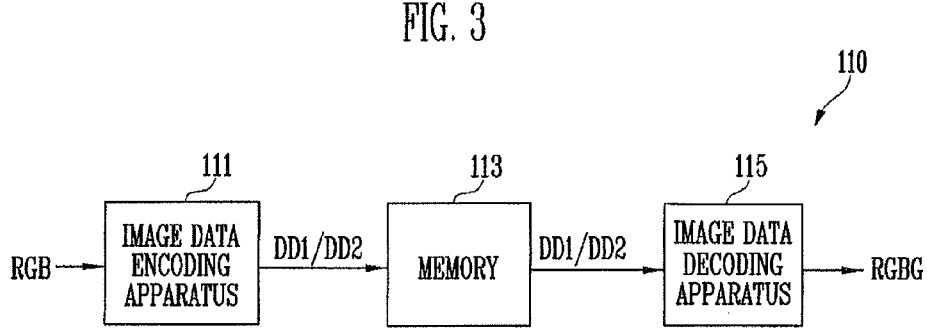
FIG. 3 illustrates an embodiment of a data converter.
Figure 4:
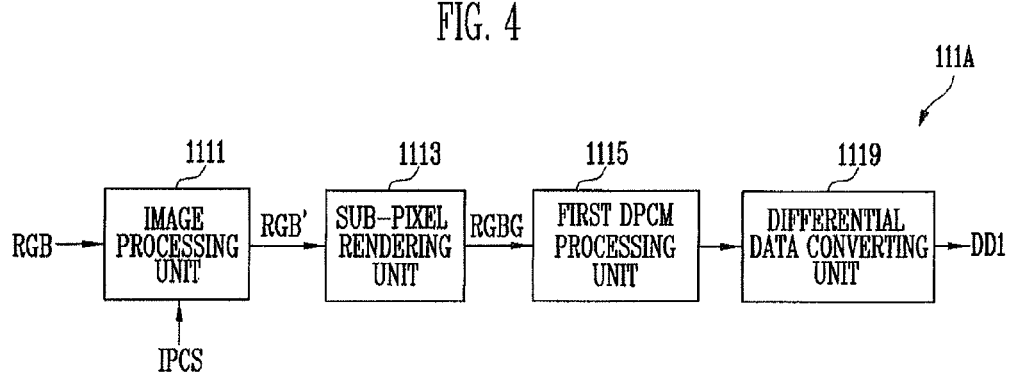
FIG. 4 illustrates an embodiment of an image data encoding apparatus.

FIG. 3 illustrates an embodiment of a data converter 110A, which, for example, may be the data converter in FIG. 2. FIG. 4 illustrates an embodiment of an image data encoding apparatus 111A, which, for example, may be the one shown in FIG. 3.

Referring to FIGS. 3 and 4, the data converter 110A includes an image data encoding apparatus 111, a memory 113, and an image data decoding apparatus 115.

The image data encoding apparatus 111 converts the first image data RGB from an external source to first differential data DD1. The first differential data DD1 includes primary differential values corresponding respectively to the sub-pixels 160R, 160G1, 160B, and 160G2. For example, the primary differential values and the sub-pixels 160R, 160G1, 160B, and 160G2 may be in one-to-one correspondence.

The image data encoding apparatus 111 converts the first image data RGB of an RGB-type into the second image data RGBG of an RG-BG type, and generates first differential data DD1 by performing differential pulse code modulation (DPCM) on the second image data RGBG.

The image data encoding apparatus 111A includes a sub-pixel rendering unit 1113 and a first DPCM processing unit 1115. The sub-pixel rendering unit 1113 converts the first image data RGB into second image data RGBG by performing sub-pixel rendering on first image data RGB. In one embodiment, the sub-pixel rendering may involve converting an original image data to correspond to the arrangement of the sub-pixels in the display unit 150.

The sub-pixel rendering unit 1113 maintains gray scale values corresponding to the green sub-pixels 160G1 and 160G2 without modification. The sub-pixel rendering unit 1113 converts gray scale values corresponding to the red sub-pixels 160R or the blue sub-pixels 160B using gray scale values corresponding to red sub-pixels 160R or blue sub-pixels 160G of an adjacent pixel.

For example, the sub-pixel rendering unit 1113 may convert gray scale values corresponding to red sub-pixels 160R or blue sub-pixels 160B according to Equation 1.

$$R/B_{pen} = \left(\frac{R/B_{n-1}^{\gamma} + R/B_n^{\gamma}}{2}\right)^{1/\gamma} \quad (1)$$

In Equation 1, $R/B_{pen}$ denotes a converted gray scale value, $R/B_{n-1}$ denotes a gray scale value corresponding to the red sub-pixel 160R or the blue sub-pixel 160B of an adjacent pixel (e.g., a left pixel, $R/B_n$ denotes a gray scale value before the conversion), and $\gamma$ denotes a gamma constant. The gamma constant is determined according to characteristics of the display device 100. The gamma constant may be generally 2.2 or 1.8 in one embodiment.

In case of the leftmost sub-pixel, no pixels exist at the left of the leftmost sub-pixel. Therefore, the gray scale value of the leftmost sub-pixel may be maintained as it is, or may be converted based on a reference gray scale value other than the gray scale value of an adjacent pixel. The reference gray scale value may be set to a gray scale value corresponding to a rightmost pixel on the previous column or a predetermined value, e.g., 128 which is half of 256 when the gray scale is divided into 256 gray scales.

For example, in a case where the reference gray scale value is 128, first image data RGB having gray scale values shown in Table 1 is converted to second image data RGBG having gray scale values shown in Table 2.

TABLE 1

| RGB type | Pixel 1 | Pixel 2 | Pixel 3 | Pixel 4 | Pixel 5 | Pixel 6 | Pixel 7 | Pixel 8 |
|---|---|---|---|---|---|---|---|---|
| R | 128 | 175 | 255 | 194 | 115 | 84 | 32 | 64 |
| G | 128 | 175 | 255 | 194 | 115 | 84 | 32 | 64 |
| B | 128 | 175 | 255 | 194 | 115 | 84 | 32 | 64 |

TABLE 2

| RGBG type | Pixel 1 | Pixel 2 | Pixel 3 | Pixel 4 | Pixel 5 | Pixel 6 | Pixel 7 | Pixel 8 |
|---|---|---|---|---|---|---|---|---|
| R | 93 | — | 219 | — | 160 | — | 65 | — |
| G | — | 154 | — | 227 | — | 101 | — | 51 |
| B | 129 | 175 | 255 | 194 | 115 | 84 | 32 | 64 |

The first DPCM processing unit 1115 generates first differential data DD1 by performing DPCM on the second image data RGBG. For example, the first DPCM processing unit 1115 generates the first differential data DD1 including primary differential values corresponding to the respective sub-pixels 160R, 160G1, 160B, and 160G2 by respectively calculating differences between gray scale values corresponding to the sub-pixels 160R, 160G1, 160B, and 160G2 and gray scale values corresponding to sub-pixels adjacent to the sub-pixels 160R, 160G1, 160B, and 160G2.

According to one embodiment, the adjacent sub-pixels may be sub-pixels adjacent to left sides of respective sub-pixels 160R, 160G1, 160B, and 160G2. In the case of the leftmost sub-pixel, no pixels exist at the left of the leftmost sub-pixel. Therefore, the primary differential value corresponding to the leftmost sub-pixel may be calculated based on a difference between the reference gray scale value and a gray scale value corresponding to the leftmost sub-pixel.

For example, in a case where the reference gray scale value is 128, the first differential data DD1 on second image data RGBG having gray scale values as shown in Table 2 are shown in Table 3.

TABLE 3

| DD1 | Pixel 1 | Pixel 2 | Pixel 3 | Pixel 4 | Pixel 5 | Pixel 6 | Pixel 7 | Pixel 8 |
|---|---|---|---|---|---|---|---|---|
| R | −35 | — | 44 | — | −34 | — | −19 | — |
| G | — | 26 | — | −28 | — | −14 | — | 19 |
| B | 35 | 21 | 36 | −33 | −45 | −17 | −33 | 13 |

As shown in Table 3, the primary differential values in the first differential data DD1 are lower than gray scale values in second image data RGBG. Therefore, the size of the first differential data DD1 may be smaller than that of second image data RGBG. The first DPCM processing unit 1115 writes the first differential data DD1 in the memory 113.

According to one embodiment, the image data encoding apparatus 111 may further include an image processing unit 1111. The image processing unit 1111 performs image-processing on the first image data RGB in response to an image processing control signal IPCS, and outputs image-processed first image data RGB' to the sub-pixel rendering unit 1113. The image processing control signal IPCS may be supplied from an external source (e.g., an application of a host) or may be supplied from a controller of the display device 100. The image processing performed may include, for example, manipulating an image such as color enhancement or sharpening.

The image processing may be performed before the first image data RGB of the RGB type is converted to the second image data RGBG of the RG-BG type, to thereby reduce power consumption.

According to one embodiment, the image data encoding apparatus 111 may further include a differential data converting unit 1119. The differential data converting unit 1119 may convert the first differential data DD1 by discarding a predetermined (e.g., lower) bit of each of the primary differential values in the first differential data DD1 according to a predetermined bit depth.

When the sizes of the primary differential values are out of range of the predetermined bit depth, the first differential data DD1 may not all be stored in the memory 113. Thus, although a slight error may occur, only an upper bit corresponding to the predetermined bit depth is maintained in each of the primary differential values, and a lower bit of each of the primary differential values is discarded. The differential data converting unit 1119 may generate header data including information on the cipher of the discarded lower bit, and may stores the header data in the memory 113.

In order to reduce the occurrence of an error, the differential data converting unit 119 may subtract a difference between primary differential values before and after conversion of a sub-pixel adjacent to the left side of each of the sub-pixels 160R, 160G1, 160B, and 160G2 from a primary differential value corresponding to each of the sub-pixels 160R, 160G1, 160B, and 160G2.

According to one embodiment, the bit depth may be determined according to the arrangement position of each of the sub-pixels 160R, 160G1, 160B, and 160G2. For example, the bit depth corresponding to the red sub-pixels 160R and the green sub-pixels 160G1 and 160G2 may be set to 4 bits, and the bit depth corresponding to the blue sub-pixels 160B may be set to 3 bits.

The first differential data DD1 including the primary differential values shown in Table 3 may be converted, for example, as shown in Table 4.

TABLE 4

| DD1 | Pixel 1 | Pixel 2 | Pixel 3 | Pixel 4 | Pixel 5 | Pixel 6 | Pixel 7 | Pixel 8 |
|---|---|---|---|---|---|---|---|---|
| R | −36 | — | 44 | — | −28 | — | −20 | — |
| G | — | 24 | — | −24 | — | −8 | — | 8 |
| B | 36 | 20 | 36 | −36 | −52 | −20 | −28 | 20 |

The differential data converting unit 1119 may write the header data together with the first differential data DD1 in memory 113. The memory 113 stores the first differential data DD1. According to an embodiment, the memory 113 may store the header data together with the first differential data DD1.

The image data decoding apparatus 115 reads the first differential data DD1 stored in the memory 113, and converts the first differential data DD1 to second image data RGBG. According to one embodiment, the image data decoding apparatus 115 may convert first differential data DD1 to second image data RGBG based on the header data.

The process in which the image data decoding apparatus 115 converts the first differential data DD1 to the second image data RGBG may correspond, for example, to the inverse process of the process in which image the data encoding apparatus 111 converts the second image data RGBG to the first differential data DD1. The image data decoding apparatus 115 outputs the second image data RGBG to the timing controller 120.

Figure 5:
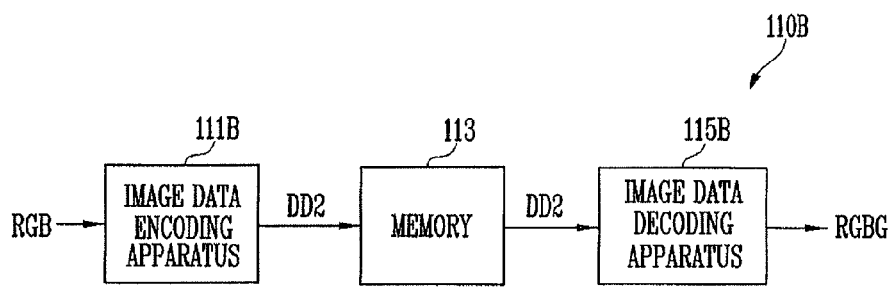
FIG. 5 illustrates another embodiment of a data converter.
Figure 6:
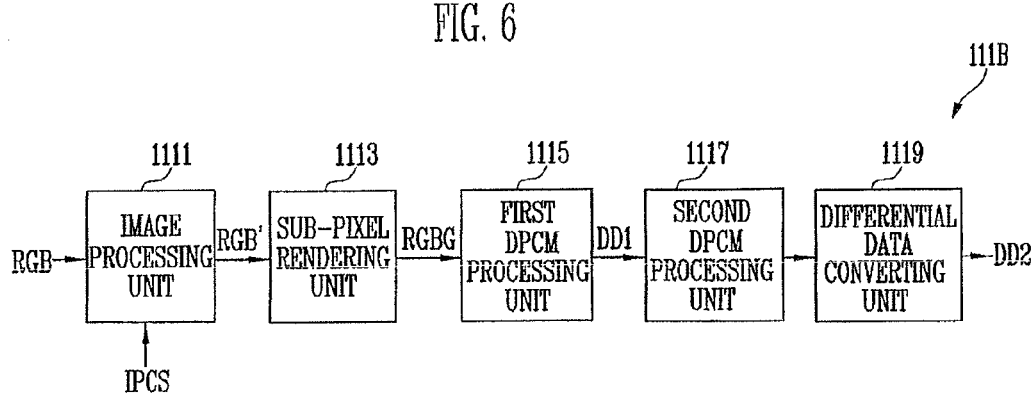
FIG. 6 illustrates another embodiment of an image data encoding apparatus.

FIG. 5 illustrates another embodiment of a data converter, which, for example, may be the data converter in FIG. 2. FIG. 6 illustrates another embodiment of an image data encoding apparatus, which, for example, is shown in FIG. 5.

Referring to FIGS. 5 and 6, the data converter 110B includes image data encoding apparatus 111B, the memory 113, and image data decoding apparatus 115B. The image data encoding apparatus 111B in FIGS. 5 and 6 may be similar to the image data encoding apparatus 111A in FIGS. 3 and 4, except for a second DPCM processing unit 1117.

The image data encoding apparatus 111B converts first image data RGB supplied from an external source to second differential data DD2. The second differential data DD2 includes secondary differential values corresponding to other green sub-pixels except the leftmost green sub-pixel, and primary differential values corresponding to sub-pixels except the other green sub-pixels. For example, the image data encoding apparatus 111B converts primary differential values corresponding to the other green sub-pixels except the leftmost green sub-pixel in the first differential data DD1 to secondary differential values.

The image data encoding apparatus 111B includes a sub-pixel rendering unit 1113, a first DPCM processing unit 1115, and a second DPCM processing unit 1117.

The second DPCM processing unit 1117 converts the first differential data DD1 output from the first DPCM processing unit 1115 to a second differential data DD2. For example, second DPCM processing unit 1117 generates a secondary differential value corresponding to each of the other green sub-pixels, by calculating a difference between a primary differential value corresponding to each of the other green sub-pixels except the leftmost green sub-pixel and a primary differential value corresponding to a sub-pixel adjacent to the left side of each of the other green sub-pixels. The second DPCM processing unit 1117 generates a second differential data DD2 by substituting secondary differential values for primary differential values corresponding to the other green sub-pixels in the first differential data DD1.

Table 5 shows an example of second differential data DD2, obtained by converting first differential data DD1 (including the primary differential values in Table 3).

TABLE 5

| DD1 | Pixel 1 | Pixel 2 | Pixel 3 | Pixel 4 | Pixel 5 | Pixel 6 | Pixel 7 | Pixel 8 |
|---|---|---|---|---|---|---|---|---|
| R | −35 | — | 44 | — | −34 | — | −19 | — |
| G | — | 26 | — | −28 | — | −14 | — | 19 |
| B | 36 | (4) | (8) | (5) | (11) | (3) | (14) | (6) |

As shown in Table 5, the secondary differential values in the parentheses are lower than the primary differential values. Therefore, the bit depth set by the secondary differential values may be lowered. Thus, the size of memory 113 for storing the second differential data DD2 may be reduced. The second DPCM processing unit 1117 writes the second differential data DD2 in the memory 113.

According to one embodiment, like the image data encoding apparatus 111A in FIGS. 3 and 4, image data encoding apparatus 111B may include an image processing unit 1111 and a differential data converting unit 1119.

The differential data converting unit 1119 may perform data conversion on the second differential data DD2 other than the first differential data DD1. For example, the second differential data DD2 in Table 5 may be converted as shown in Table 6.

TABLE 6

| DD1 | Pixel 1 | Pixel 2 | Pixel 3 | Pixel 4 | Pixel 5 | Pixel 6 | Pixel 7 | Pixel 8 |
|---|---|---|---|---|---|---|---|---|
| R | −35 | — | 46 | — | −34 | — | −18 | — |
| G | — | 26 | — | −26 | — | −14 | — | 18 |
| B | 36 | 6 | 10 | 10 | 10 | 2 | 14 | 6 |

Figure 7:
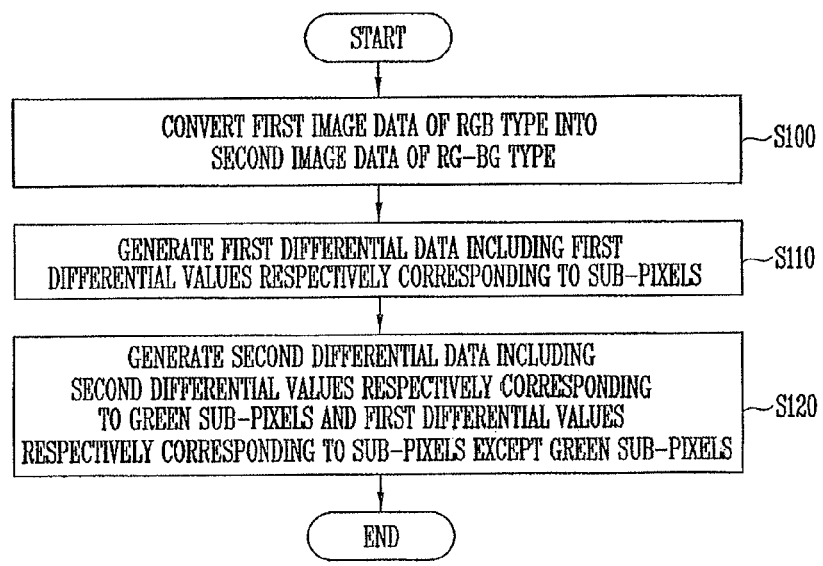
FIG. 7 illustrates an embodiment of an image data encoding method.

FIG. 7 illustrates an embodiment of an image data encoding method. Referring to FIG. 7, according to this method the image data encoding apparatus 111 converts a first image data RGB of an RGB type to a second image data RGBG of an RG-BG type, by performing sub-pixel rendering on the first image data RGB (S100).

The image data encoding apparatus 111 generates first differential data DD1 including primary differential values corresponding respectively to the sub-pixels 160R, 160G1, 160B, and 160G2. This may be accomplished by performing DPCM on second image data RGBG. For example, the image data encoding apparatus 111 may generate first differential data DD1 by respectively calculating, as the primary differential values, differences between gray scale values corresponding to the sub-pixels 160R, 160G1, 160B, and 160G2 and gray scale values corresponding to sub-pixels adjacent to the sub-pixels 160R, 160G1, 160B, and 160G2 (S110).

The image data encoding apparatus 111 converts the first differential data DD1 to second differential data DD2. The image data encoding apparatus 111 generates a secondary differential value corresponding to each of the other green sub-pixels, by calculating a difference between a primary differential value corresponding to each of the other green sub-pixels except the leftmost green sub-pixel and a primary differential value corresponding to a sub-pixel adjacent to the left side of each of the other green sub-pixels. The image data encoding apparatus 111 generates the second differential data DD2 by substituting secondary differential values for primary differential values corresponding to the other green sub-pixels in the first differential data DD1 (S120).

The size of the first or second differential data DD1 or DD2 is smaller than that of the second image data RGBG. Thus, the first or second differential data DD1 or DD2 may be implemented with memory 113 having a small capacity.

In accordance with one or more of the aforementioned embodiments, the function blocks shown in at least FIGS. 3, 4, 5, and/or 6 may be correspond to logic, which may be implemented in hardware, software, or a combination thereof. In one embodiment, the sub-pixel rendering unit 1113, the first DPCM processing unit 1115, and the second DPCM processing unit 1117 may be considered to be first, second, and third logic respectively. When implemented in software, code executable by a processor may stored in a computer-readable medium to perform the operations corresponding to the function blocks in FIGS. 3, 4, 5, and/or 6.

By way of summation and review, each pixel in a flat panel display may be configured with a plurality of sub-pixels that emit primary colors, e.g., red, green, and blue. Various sub-pixel arrangements have been developed in an attempt to overcome limitations on micro fabrication and to increase resolution. For example, in an RG-BG type display such as a pentile display, a pixel is configured with one of red and blue sub-pixels and a green sub-pixel.

As resolution increases, the amount of data for driving a panel increases. An increase in data produces an increase power consumption. Also, larger size memories are also used.

In accordance with one or more of the aforementioned embodiments, image data is encoded to allow RG-BG type image data to be compressed without losses. Also, the amount of data for driving the panel may be compressed, and accordingly less power is consumed and a memory of smaller size may be used.

The methods and processes described herein may be performed by code or instructions to be executed by a computer, processor, or controller. Because the algorithms that form the basis of the methods are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. An apparatus for encoding an image data, comprising:
a sub-pixel renderer 1 to convert first image data of an RGB type to second image data of an RG-BG type;
a first differential pulse code modulation (DPCM) processor to generate first differential data including primary differential values corresponding to respective sub-pixels, the first DPCM processor to calculate a gray value difference from a neighboring sub-pixel for each of the sub-pixels based on the second image data; and
a second DPCM processor to generate second differential data including secondary differential values corresponding respectively to green sub-pixels except a leftmost green sub-pixel, the second DPCM processor to calculate a primary differential value difference from the neighboring sub-pixel for each of the green sub-pixels except the leftmost green sub-pixel based on the first differential data, wherein the neighboring sub-pixel is adjacent to a left side of each of the sub-pixels.

2. The apparatus as claimed in claim 1, wherein a primary differential value corresponding to a leftmost sub-pixel among the primary differential values is based on a difference between a reference gray scale value and a gray scale value corresponding to the leftmost sub-pixel.

3. The apparatus as claimed in claim 2, wherein the reference gray scale value is a gray scale value corresponding to a rightmost sub-pixel of a previous column.

4. The apparatus as claimed in claim 1, wherein the second differential data includes the primary differential values corresponding to leftmost green sub-pixels together with the secondary differential values corresponding to respective ones of the green sub-pixels except for the leftmost green sub-pixel.

5. The apparatus as claimed in claim 1, further comprising:
a differential data converter to convert the first differential data by discarding a lower bit of each of the primary differential values, corresponding to a predetermined bit depth according to the arrangement position of the sub-pixels.

6. The apparatus as claimed in claim 1, further comprising:
an image processor to perform image processing on the first image data based on an image processing control signal, and to output the image-processed first image data to the sub-pixel renderer.

7. A method for encoding an image data, the method comprising:
converting first image data of an RGB type to second image data of an RG-BG type by performing sub-pixel rendering on the first image data;
generating first differential data including primary differential values corresponding to respective sub-pixels, the first differential data generated by calculating a gray value difference from a neighboring sub-pixel for each of the sub-pixels based on the second image data; and
generating a second differential data including secondary differential values corresponding respectively to green sub-pixels except the leftmost green sub-pixel, the second differential data generated by calculating a primary differential value difference from the neighboring sub-pixel for each of the green sub-pixels except the leftmost green sub-pixel based on the first differential data, wherein the neighboring sub-pixel is adjacent to a left side of each of the sub-pixels.

8. The method as claimed in claim 7, wherein the primary differential value corresponding to a leftmost sub-pixel among the primary differential values is based on a difference between a reference gray scale value and a gray scale value corresponding to the leftmost sub-pixel.

9. The method as claimed in claim 7, wherein the reference gray scale value corresponds to a rightmost sub-pixel of a previous column.

10. The method as claimed in claim 7, wherein the second differential data includes the primary differential values corresponding to respective leftmost sub-pixels together with the secondary differential values corresponding to respective other green sub-pixels other than the leftmost pixel.

11. The method as claimed in claim 7, further comprising:
converting the first differential data by discarding a lower bit of each of the primary differential values, corresponding to a predetermined bit depth according to the arrangement position of the sub-pixels.

12. The method as claimed in claim 7, wherein converting the first image data includes:
image-processing the first image data based on an image processing control signal; and
converting the image-processed first image data to the second image data by performing sub-pixel rendering on the first image data.

* * * * *